(12) United States Patent
Cai et al.

(10) Patent No.: US 12,476,301 B2
(45) Date of Patent: Nov. 18, 2025

(54) BATTERY MODULE

(71) Applicant: CONTEMPORARY AMPEREX TECHNOLOGY (HONG KONG) LIMITED, Hong Kong (CN)

(72) Inventors: Jinrong Cai, Fujian (CN); Kaiqin Yu, Fujian (CN); Shoulong Wang, Fujian (CN); Yadong Jiang, Fujian (CN); Jihua Yao, Fujian (CN); Mu Qian, Fujian (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 857 days.

(21) Appl. No.: 17/684,776

(22) Filed: Mar. 2, 2022

(65) Prior Publication Data

US 2022/0271365 A1    Aug. 25, 2022

Related U.S. Application Data

(63) Continuation of application No. PCT/CN2020/106460, filed on Jul. 31, 2020.

(30) Foreign Application Priority Data

Sep. 6, 2019    (CN) .......................... 201921478827.8

(51) Int. Cl.
*H01M 10/6555*    (2014.01)
*H01M 10/48*    (2006.01)
(Continued)

(52) U.S. Cl.
CPC ..... *H01M 10/6555* (2015.04); *H01M 10/486* (2013.01); *H01M 10/613* (2015.04); *H01M 50/264* (2021.01)

(58) Field of Classification Search
CPC ........... H01M 10/613; H01M 10/6555; H01M 10/486; H01M 50/264
See application file for complete search history.

(56) References Cited

U.S. PATENT DOCUMENTS 10,608,301 B2    3/2020    Ing et al.
10,704,961 B2    7/2020    Wang et al.
(Continued)

FOREIGN PATENT DOCUMENTS

CN    204103003 U    1/2015
CN    205861226 U    1/2017
(Continued)

OTHER PUBLICATIONS

English translation of CN Publication 208873773, May 2019.*
(Continued)

*Primary Examiner* — Brittany L Raymond
(74) *Attorney, Agent, or Firm* — Scully, Scott, Murphy & Presser, P.C.

(57) ABSTRACT

Disclosed is a battery module. The battery module includes a plurality of batteries, a thermal conduction plate, and a temperature sensing element. The plurality of batteries are arranged in a length direction. The thermal conduction plate is located between the adjacent batteries and fits the batteries. The temperature sensing element is in contact with the thermal conduction plate. In the battery module, the thermal conduction plate fits the batteries. Heat generated by the batteries is transferred to the thermal conduction plate. The temperature sensing element is in contact with the thermal conduction plate to acquire a temperature of the batteries. Because the temperature of the batteries that is acquired by the temperature sensing element via the thermal conduction plate is close to an actual temperature of the batteries, a deviation between the temperature acquired by the tempera- (Continued)

ture sensing element and the actual temperature of the batteries can be reduced.

17 Claims, 12 Drawing Sheets

(51) Int. Cl.
*H01M 10/613* (2014.01)
*H01M 50/264* (2021.01)

(56) References Cited

U.S. PATENT DOCUMENTS

| | | | |
|---|---|---|---|
| 2015/0037616 A1* | 2/2015 | Wyatt | H01M 10/613 |
| | | | 429/153 |
| 2018/0045576 A1 | 2/2018 | Wang et al. | |
| 2018/0045577 A1 | 2/2018 | Sun | |
| 2019/0067763 A1 | 2/2019 | Ing et al. | |

FOREIGN PATENT DOCUMENTS

| | | | |
|---|---|---|---|
| CN | 206134864 U | | 4/2017 |
| CN | 206177474 U | | 5/2017 |
| CN | 206293584 | * | 6/2017 |
| CN | 206293584 U | | 6/2017 |
| CN | 206774613 | * | 12/2017 |
| CN | 206774613 U | | 12/2017 |
| CN | 207426063 U | | 5/2018 |
| CN | 208873773 | * | 5/2019 |
| CN | 208873773 U | | 5/2019 |
| CN | 210403960 U | | 4/2020 |

OTHER PUBLICATIONS

English translation of CN Publication 206774613, Dec. 2017.*
English translation of CN Publication 206293584, Jun. 2017.*
Extended European Search Report dated Apr. 11, 2022 received in European Patent Application No. EP 20861658.1.
International Search Report dated Nov. 3, 2020 issued in PCT/CN2020/106460.

* cited by examiner

BATTERY MODULE

CROSS-REFERENCE TO RELATED APPLICATIONS

This application is a continuation of International Application No. PCT/CN2020/106460, filed on Jul. 31, 2020, which claims priority to Chinese Patent Application No. 201921478827.8, filed on Sep. 6, 2019. The disclosures of the aforementioned applications are hereby incorporated by reference in their entireties.

TECHNICAL FIELD

The present application relates to the field of traction batteries, and in particular, to a battery module.

BACKGROUND

At present, there are two temperature sampling methods for soft pack battery modules. One is to dispose a temperature sensing element (such as a NTC thermistor) on a connecting plate (which is located above batteries and connects electrode terminals of adjacent batteries). This method has the following problems: a tab of a soft pack battery is thin, and it is difficult to dissipate heat; in addition, overcurrent through the connecting plate is relatively large when the battery module is in a large current working condition, so that an acquired temperature is higher than an actual temperature of the batteries. The other is to directly fasten the temperature sensing element to the batteries by using an adhesive. This method has the following problems: due to the impact of the temperature and battery expansion (the performance of the adhesive deteriorates), when the battery module is used for a long time, the reliability of a connection between the thermistor and the batteries deteriorates; this results in a large deviation between the temperature acquired by the temperature sensing element and the actual temperature of the batteries.

SUMMARY

In view of the disadvantages in the prior art, an objective of the embodiments of the present application is to provide a battery module and a device, which can reduce a deviation between a temperature acquired by a temperature sensing element and an actual temperature of batteries, and improve the reliability and accuracy of temperature sampling of the battery module.

In order to achieve the foregoing objective, embodiments of the present application provide a battery module. The battery module includes a plurality of batteries, a thermal conduction plate, and a temperature sensing element. The plurality of batteries are arranged in a length direction. The thermal conduction plate is located between the adjacent batteries and fits the batteries. The temperature sensing element is in contact with the thermal conduction plate.

In an embodiment, the battery module further includes a fastening holder. The fastening holder includes a surrounding wall and a hollow cavity encircled by the surrounding wall. An inner side surface of the surrounding wall is provided with a limiting groove connecting with the hollow cavity. The thermal conduction plate is inserted into the limiting groove and seals the hollow cavity. The temperature sensing element is fastened to the surrounding wall of the fastening holder.

In an embodiment, the surrounding wall is provided with an aperture. The thermal conduction plate has an exposed part exposed from the aperture. The temperature sensing element is in contact with the exposed part of the thermal conduction plate.

In an embodiment, the surrounding wall is provided with an accommodation groove. The aperture is located inside the accommodation groove. The temperature sensing element is fastened to the accommodation groove and in contact with the exposed part of the thermal conduction plate.

In an embodiment, the surrounding wall includes a top wall, a bottom wall, and two side walls. The accommodation groove is recessed inward relative to a surface of the top wall in the length direction. The accommodation groove is located at one end of the top wall in a width direction.

In an embodiment, the accommodation groove includes a first portion and a second portion. The first portion extends in the width direction, and the aperture is located inside the first portion. The second portion is connected to the first portion and extends from the first portion in a height direction.

In an embodiment, the battery module further includes an isolation board, an acquisition line, and a plug connector. The isolation board is disposed above a corresponding battery. One end of the acquisition line is connected to the temperature sensing element. The other end of the acquisition line is connected to the plug connector. The plug connector is connected to a circuit board. A portion of the acquisition line being connected to the temperature sensing element is accommodated in the accommodation groove.

In an embodiment, the isolation board is provided with a buckle. The acquisition line is fastened on the isolation board through the buckle. The top wall of the fastening holder is provided with a cabling groove with an upward opening. The cabling groove communicates with the second portion of the accommodation groove. The acquisition line passes through the cabling groove.

In an embodiment, the limiting groove includes a first limiting groove formed in the top wall, the bottom wall, and one of the side walls, and a second limiting groove formed in the other side wall. The second limiting groove extends through the other side wall in the width direction.

In an embodiment, the thermal conduction plate includes a body portion and a bent portion. The bent portion is connected to the body portion and bent from the body portion in the length direction. The second limiting groove extends through the side wall of the fastening holder being away from the accommodation groove in the width direction. The body portion is inserted into the fastening holder via the second limiting groove. The bent portion is located on an outer side of the fastening holder in the length direction.

Beneficial effects of the present application are as follows:

In the battery module in the embodiments of the present application, the thermal conduction plate fits the batteries. Heat generated by the batteries is transferred to the thermal conduction plate, and then transferred to the outside via the thermal conduction plate. The temperature sensing element is in contact with the thermal conduction plate to acquire a temperature of the batteries. Because the temperature of the batteries that is acquired by the temperature sensing element via the thermal conduction plate is close to an actual temperature of the batteries, a deviation between the temperature acquired by the temperature sensing element and the actual temperature of the batteries can be reduced, and the reliability and accuracy of temperature sampling of the battery module can be improved.

REFERENCE NUMERALS ARE EXPLAINED AS FOLLOWS

Figure 1:
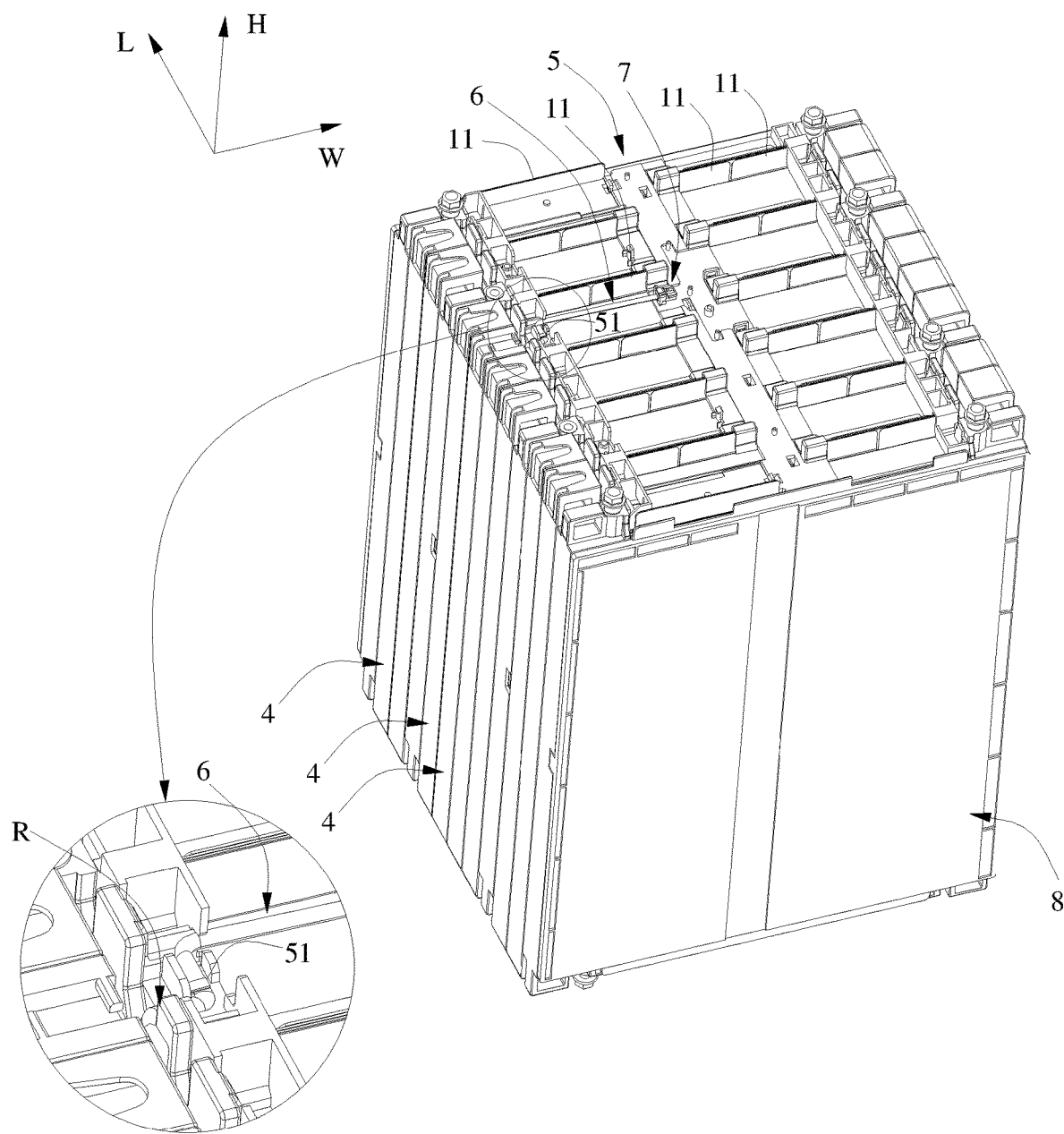
FIG. 1 is a stereograph of a battery module provided by an embodiment of the present application.

1: Battery;
11: Tab;
2: Thermal conduction plate;
21: Exposed part;
22: Body portion;
23: Bent portion;
3: Temperature sensing element;
4: Fastening holder;
41: Surrounding wall;
41a: Inner side surface;
41b: Top wall;
41c: Bottom wall;
41d: Side wall;
411: Limiting groove;
411a: First limiting groove;
411b: Second limiting groove;
412: Aperture;
413: Accommodation groove;
413a: First portion;
413b: Second portion;
42: Hollow cavity;
R: Cabling groove;
5: Isolation board;
51: Buckle;
52: Through groove;
6: Acquisition line;
7: Plug connector;
8: End plate;
L: Length direction;
W: Width direction;
H: Height direction.

DETAILED DESCRIPTION OF THE EMBODIMENTS

The drawings show embodiments of the present application, and it can be understood that the disclosed embodiments are merely examples of the present application, and the present application can be implemented in various forms. Therefore, the specific details disclosed herein should not be construed as limiting. Instead, it is used only as the basis of the claims and an indicative basis for instructing those of ordinary skill in the art to implement the present application in various ways.

In the description of the present application, unless otherwise clearly specified and limited, the terms "first" and "second" are used herein only for the purpose of description and are not intended to indicate or imply relative importance. The term "a plurality of" means more than two (including two). Unless otherwise specified or explained, the term "connected" should be understood in a broad sense. For example, the "connection" may be a fixed connection, a removable connection, or an integral connection; may be an electrical connection or a signal connection; the "connection" may be a direct connection or an indirect connection by using an intermediate medium. A person of ordinary skill in the art may understand specific meanings of the foregoing terms in the present application based on a specific situation.

In the description of this specification, it should be understood that orientation words indicating orientation such as "above" and "below" and the like described in the embodiments of the present application is described from the angle shown in the drawings, and should not be construed as a limitation to the embodiments of the present application.

The following describes a battery module according to the present application in detail with reference to the drawings.

Figure 2:
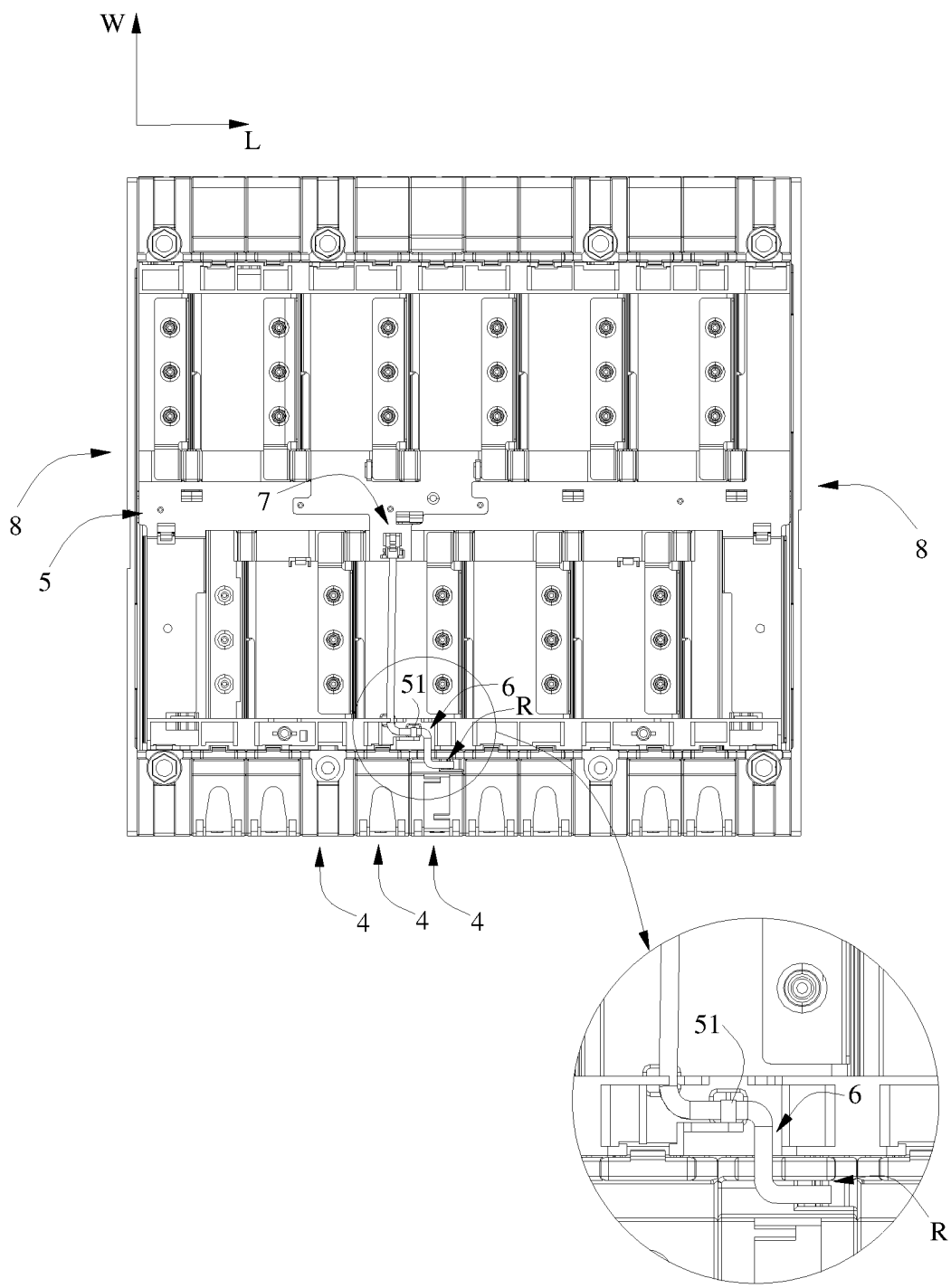
FIG. 2 is a top view of a battery module provided by an embodiment of the present application.

Referring to FIG. 1 to FIG. 6, the battery module in the present application includes a plurality of batteries 1, a thermal conduction plate 2, and a temperature sensing element 3. The plurality of batteries 1 of the battery module are arranged in a length direction L. The thermal conduction plate 2 is located between the adjacent batteries 1 and fits the batteries 1. The temperature sensing element 3 is in contact with the thermal conduction plate 2. As shown in FIG. 2, the battery module may further include a fastening holder 4, an isolation board 5, an acquisition line 6, and a plug connector 7.

In the battery module in the present application, the thermal conduction plate 2 fits the batteries 1. Heat generated by the batteries 1 is transferred to the thermal conduction plate 2, and then transferred to the outside via the thermal conduction plate 2. The temperature sensing element 3 is in contact with the thermal conduction plate 2 to acquire a temperature of the batteries 1. Because the temperature of the batteries 1 that is acquired by the temperature sensing element 3 via the thermal conduction plate 2 is close to an actual temperature of the batteries 1, a deviation between the temperature acquired by the temperature sensing element 3 and the actual temperature of the batteries can be reduced, and the reliability and accuracy of temperature sampling of the battery module can be improved.

Figure 4:
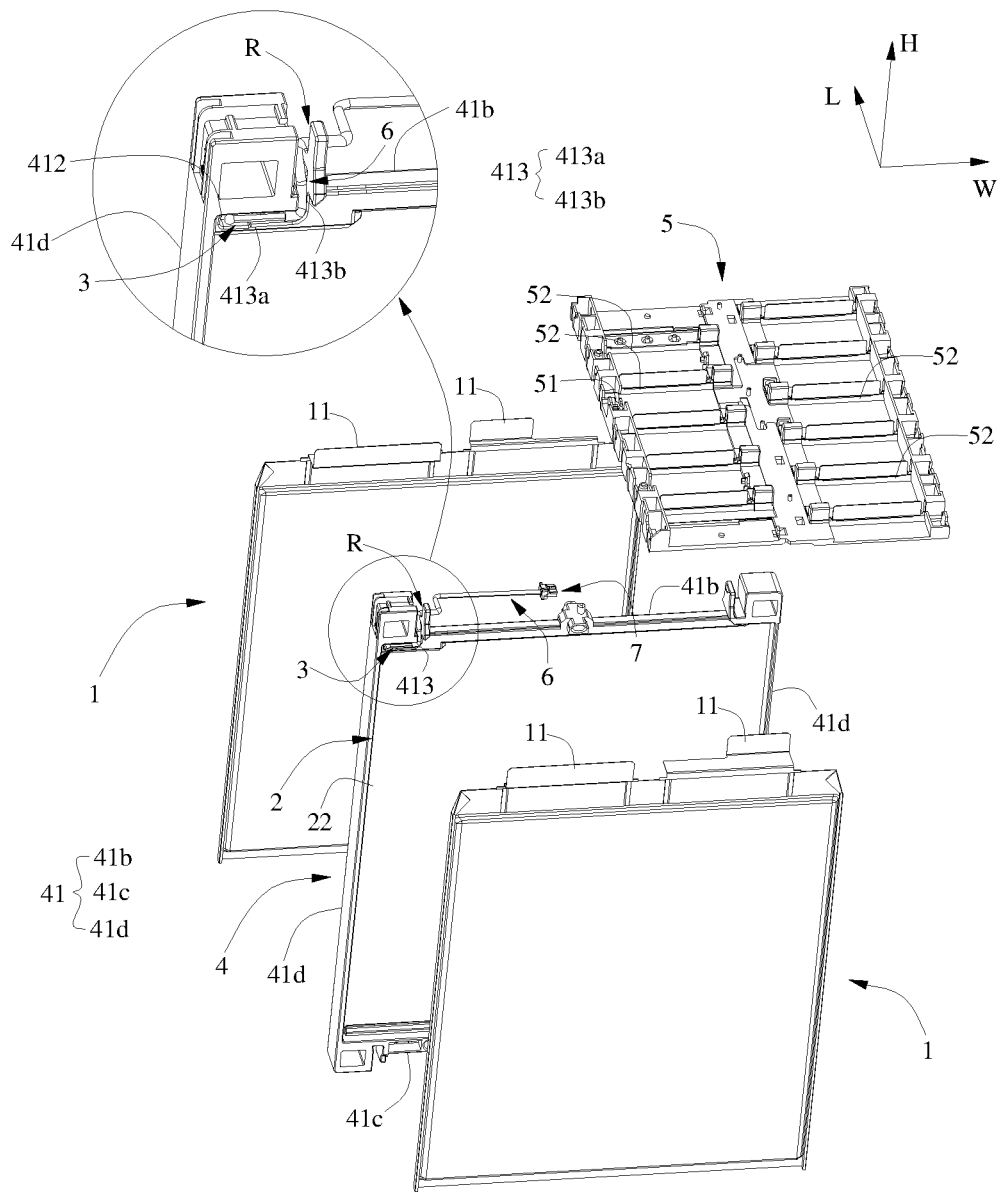
FIG. 4 is an exploded stereoscopic view of the battery module in FIG. 3.

Referring to FIG. 4, the batteries 1 are soft pack batteries (or referred to as bag batteries). The soft pack battery includes a packaging bag (for example, formed by an aluminum plastic film), an electrode assembly, and a tab 11. The electrode assembly includes a positive electrode plate, a negative electrode plate, and a separator film that separates the positive electrode plate and the negative electrode plate. A part of the tab is packaged in the packaging bag and the other part extends out of the packaging bag. The tab 11 may be directly formed by the electrode plate or use an independent conductive material and be electrically connected to a current collector.

The thermal conduction plate 2 is an aluminum plate. The thermal conduction plate 2 includes a body portion 22 and a bent portion 23. The bent portion 23 is connected to the body portion 22 and bent from the body portion 22 in the length direction L.

The temperature sensing element 3 is an NTC thermistor and configured to acquire a temperature.

Figure 3:
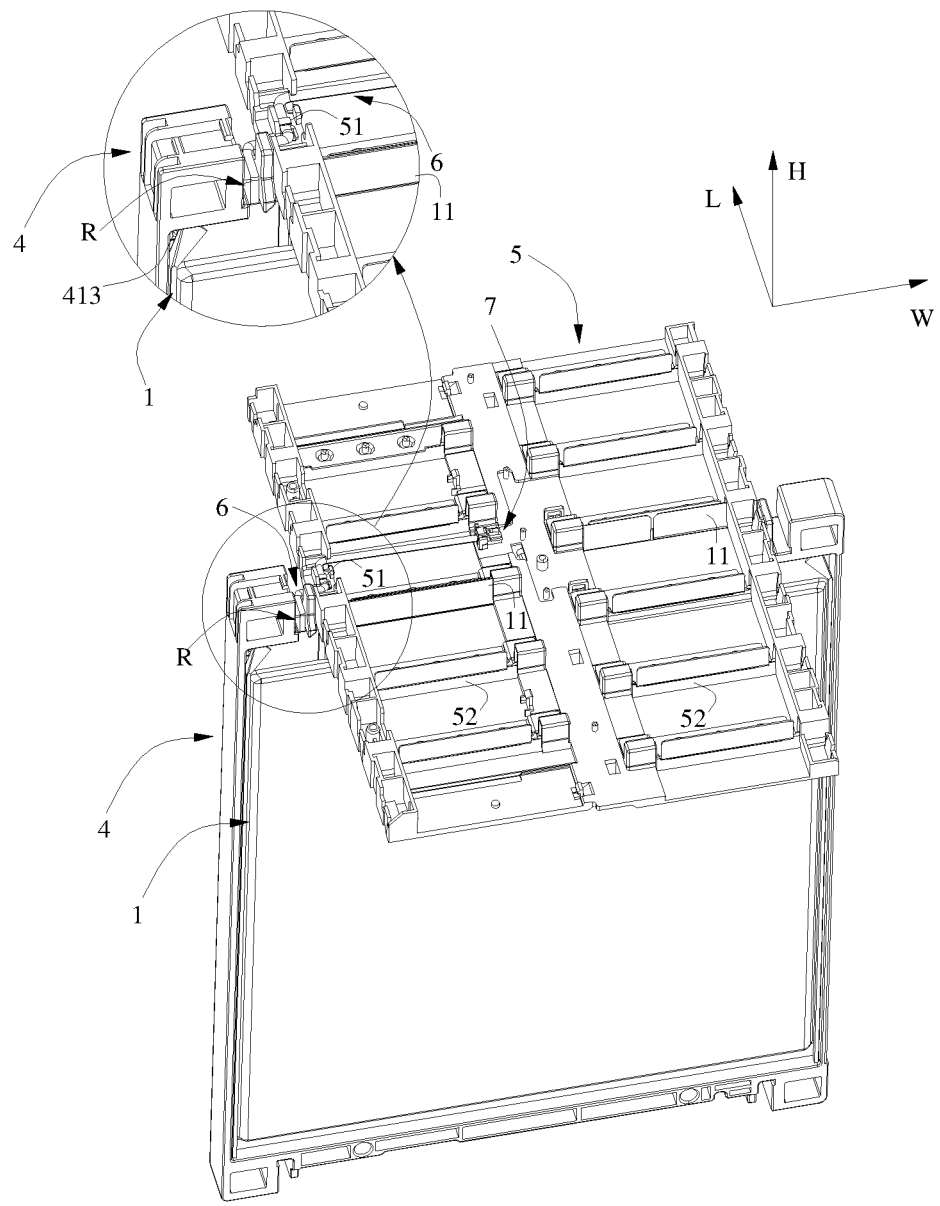
FIG. 3 is a partial stereoscopic view of a battery module provided by an embodiment of the present application.
Figure 5:
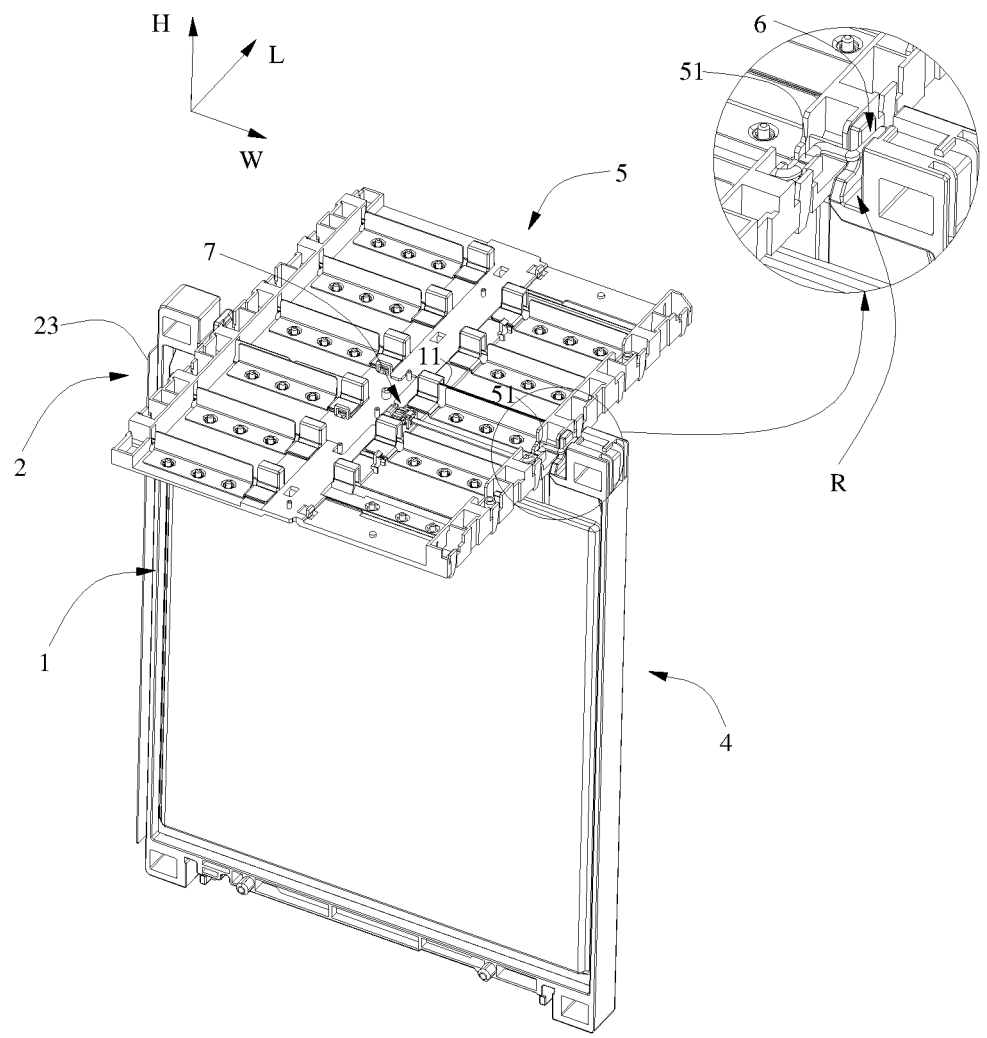
FIG. 5 is a partial stereoscopic view of a battery module from another angle of view provided by an embodiment of the present application.

Referring to FIG. 3 to FIG. 5, the temperature sensing element 3 may be fastened by using the fastening holder 4. A material of the fastening holder 4 is plastic. As shown in FIG. 7 to FIG. 12, the fastening holder 4 includes a surrounding wall 41 and a hollow cavity 42 encircled by the surrounding wall 41. Further, the surrounding wall 41 includes a top wall 41b, a bottom wall 41c, and two side walls 41d. An inner side surface 41a of the surrounding wall 41 is provided with a limiting groove 411 connecting with the hollow cavity 42. The thermal conduction plate 2 is inserted into the limiting groove 411 and seals the hollow cavity 42. The temperature sensing element 3 is fastened to the surrounding wall 41 of the fastening holder 4. In this way, the temperature sensing element 3 is fastened.

Figure 6:
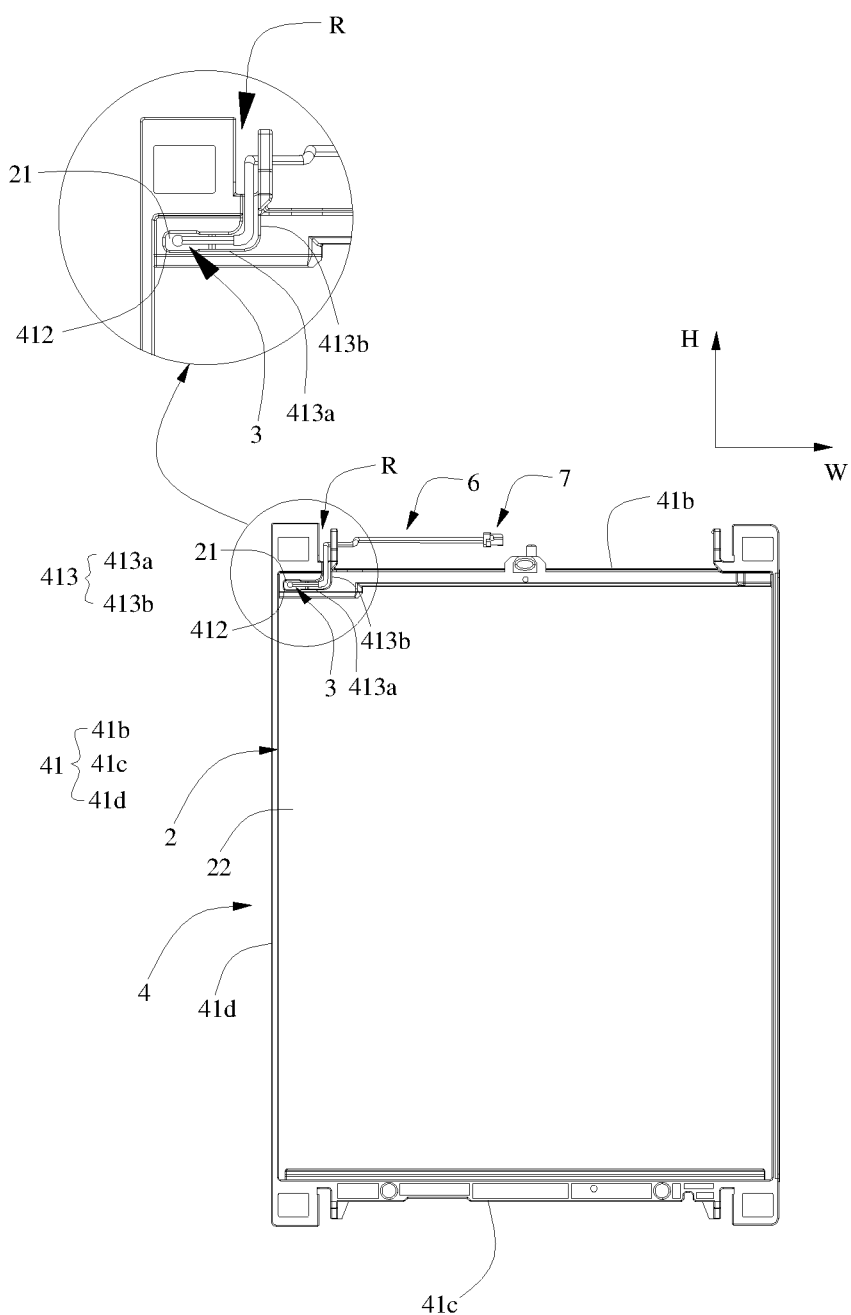
FIG. 6 is a front view of the battery module in FIG. 3, in which an isolation board is not shown.
Figure 7:
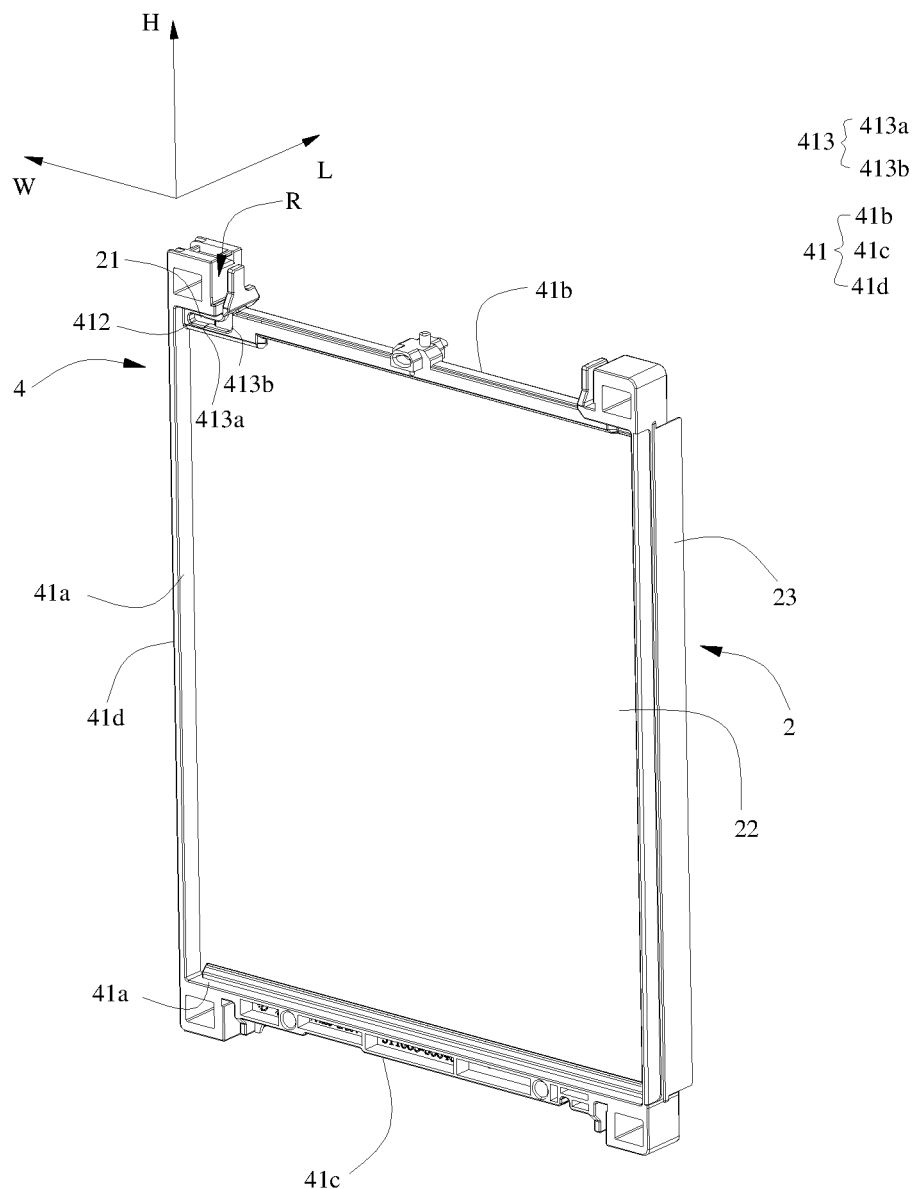
FIG. 7 is a stereoscopic view of assembly of a fastening holder and a thermal conduction plate of a battery module provided by an embodiment of the present application.
Figure 8:
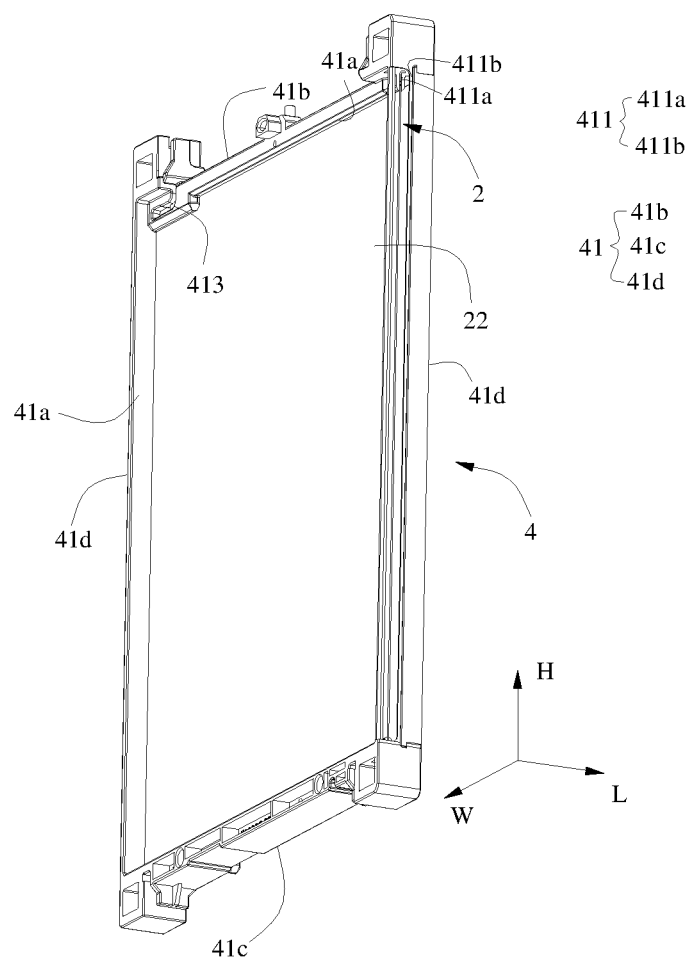
FIG. 8 is a schematic diagram of assembly of a fastening holder and a thermal conduction plate of a battery module provided by an embodiment of the present application.

As shown in FIG. 6 and FIG. 7, to facilitate the contact between the temperature sensing element 3 fastened to the fastening holder 4 and the thermal conduction plate 2, the surrounding wall 41 is provided with an aperture 412. The thermal conduction plate 2 has an exposed part 21 exposed from the aperture 412. The temperature sensing element 3 is in contact with the exposed part 21 of the thermal conduction plate 2.

Referring to FIG. 6 to FIG. 10, the surrounding wall 41 is provided with an accommodation groove 413. The aperture 412 is located inside the accommodation groove 413. The temperature sensing element 3 is fastened to the accommodation groove 413 and in contact with the exposed part 21 of the thermal conduction plate 2. Therefore, the temperature sensing element 3 does not need to occupy additional space. This increases energy density of the battery module.

As shown in FIG. 6 to FIG. 11, further, the accommodation groove 413 is recessed inward relative to a surface of the top wall 41b in the length direction L. The accommodation groove 413 is located at one end of the top wall 41b in a width direction W. In other words, the temperature sensing element 3 is disposed at one end of the top wall 41b in the width direction W. At this position, the temperature acquired by the temperature sensing element 3 is the closest to the actual temperature of the batteries 1. Because a position close to the middle of the top wall 41b in the width direction W is seriously affected by heating at a position of the tab 11 of the battery 1, the temperature actually acquired by the temperature sensing element 3 is relatively high. Because heat dissipation of the battery 1 is relatively good at a position on the two side walls 41d, the temperature actually acquired by the temperature sensing element 3 is relatively low. Referring to FIG. 8 to FIG. 12, the limiting groove 411 includes a first limiting groove 411a formed in the top wall 41b, the bottom wall 41c, and one of the side walls, and a second limiting groove 411b formed in the other side wall 41d. The second limiting groove 411b extends through the other side wall 41d in the width direction W. The second limiting groove 411b extends through the side wall 41d of the fastening holder 4 being away from the accommodation groove 413 in the width direction W, to prevent the second limiting groove 411b from affecting temperature acquisition of the temperature sensing element 3. The body portion 22 of the thermal conduction plate 2 is inserted into the fastening holder 4 via the second limiting groove 411b. The bent portion 23 is located on an outer side of the fastening holder 4 in the length direction L. In this way, the thermal conduction plate 2 is mounted to the fastening holder 4.

Figure 9:
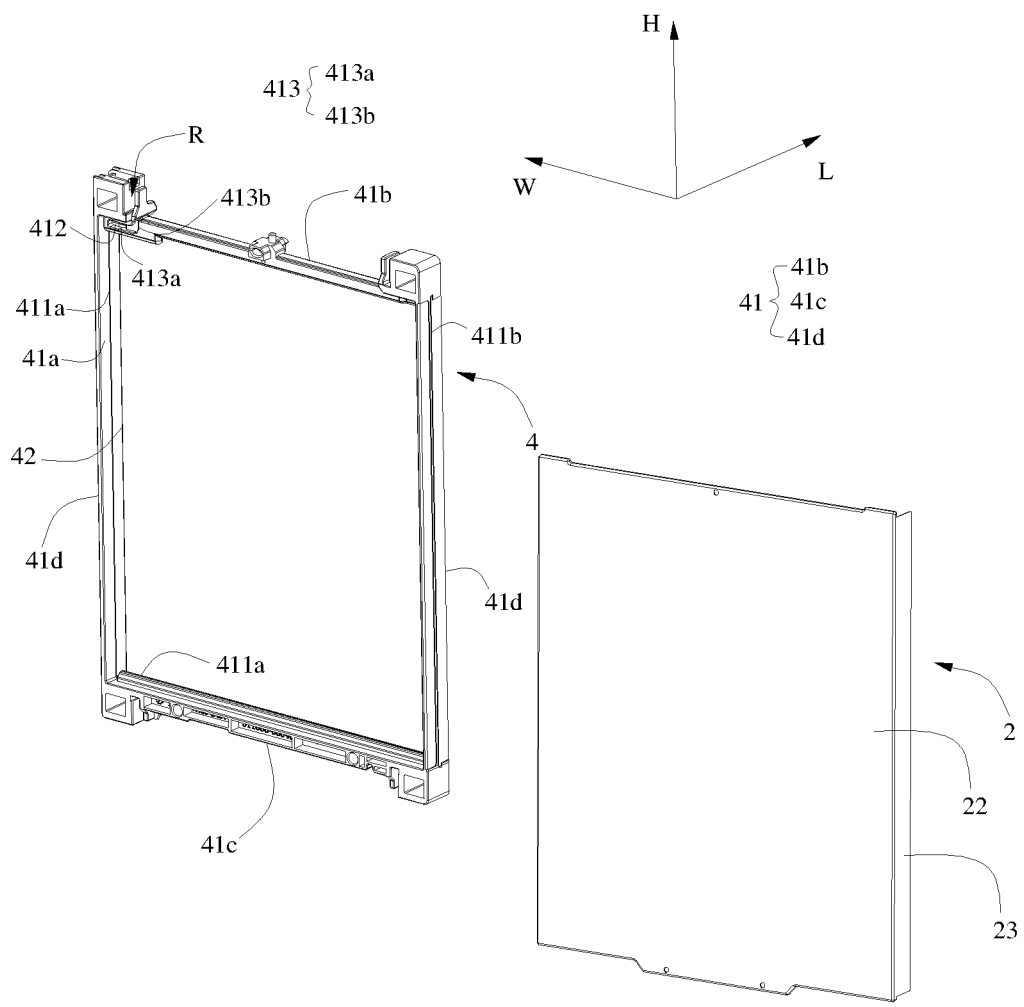
FIG. 9 is an exploded stereoscopic view of a fastening holder and a thermal conduction plate of a battery module provided by an embodiment of the present application.
Figure 10:
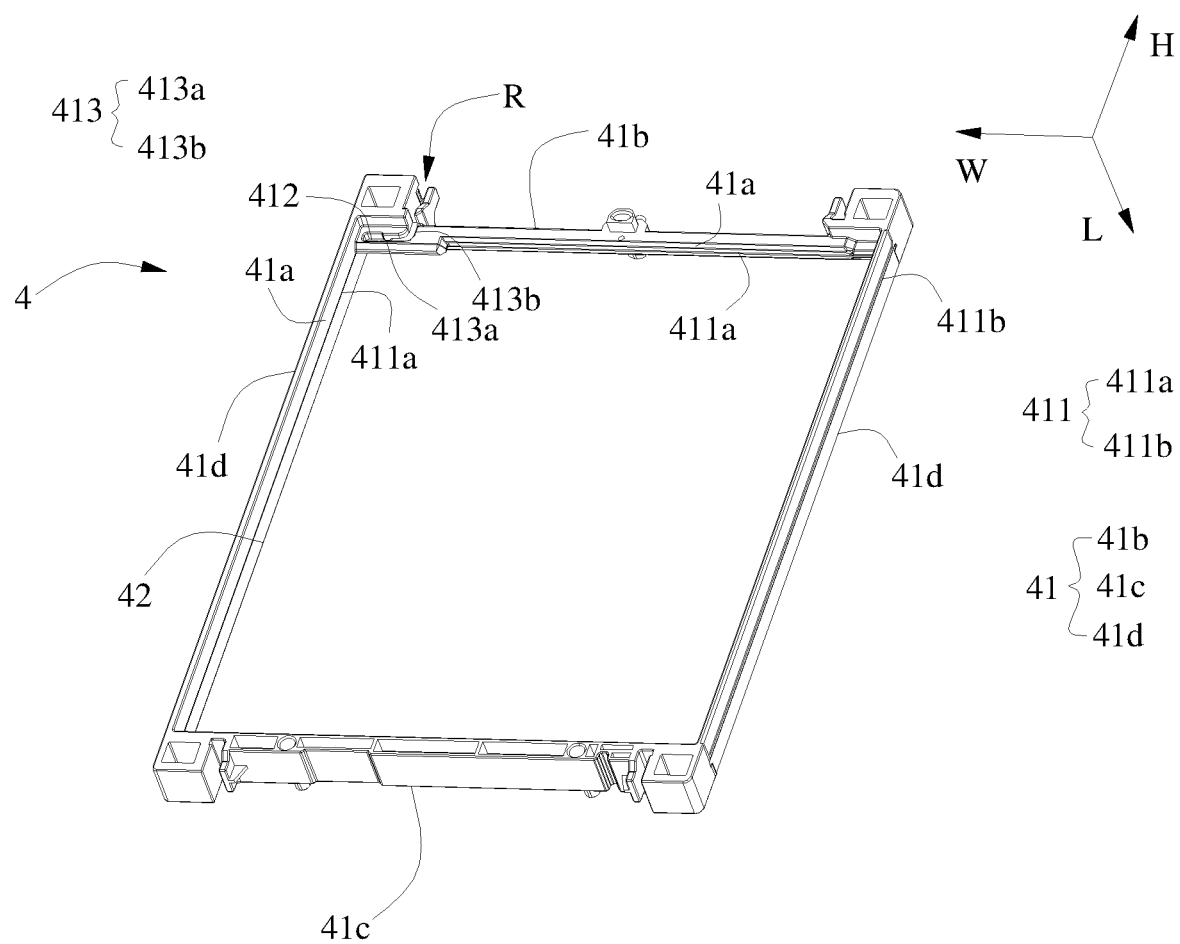
FIG. 10 is a stereoscopic view of a fastening holder of a battery module from an angle of view provided by an embodiment of the present application.
Figure 11:
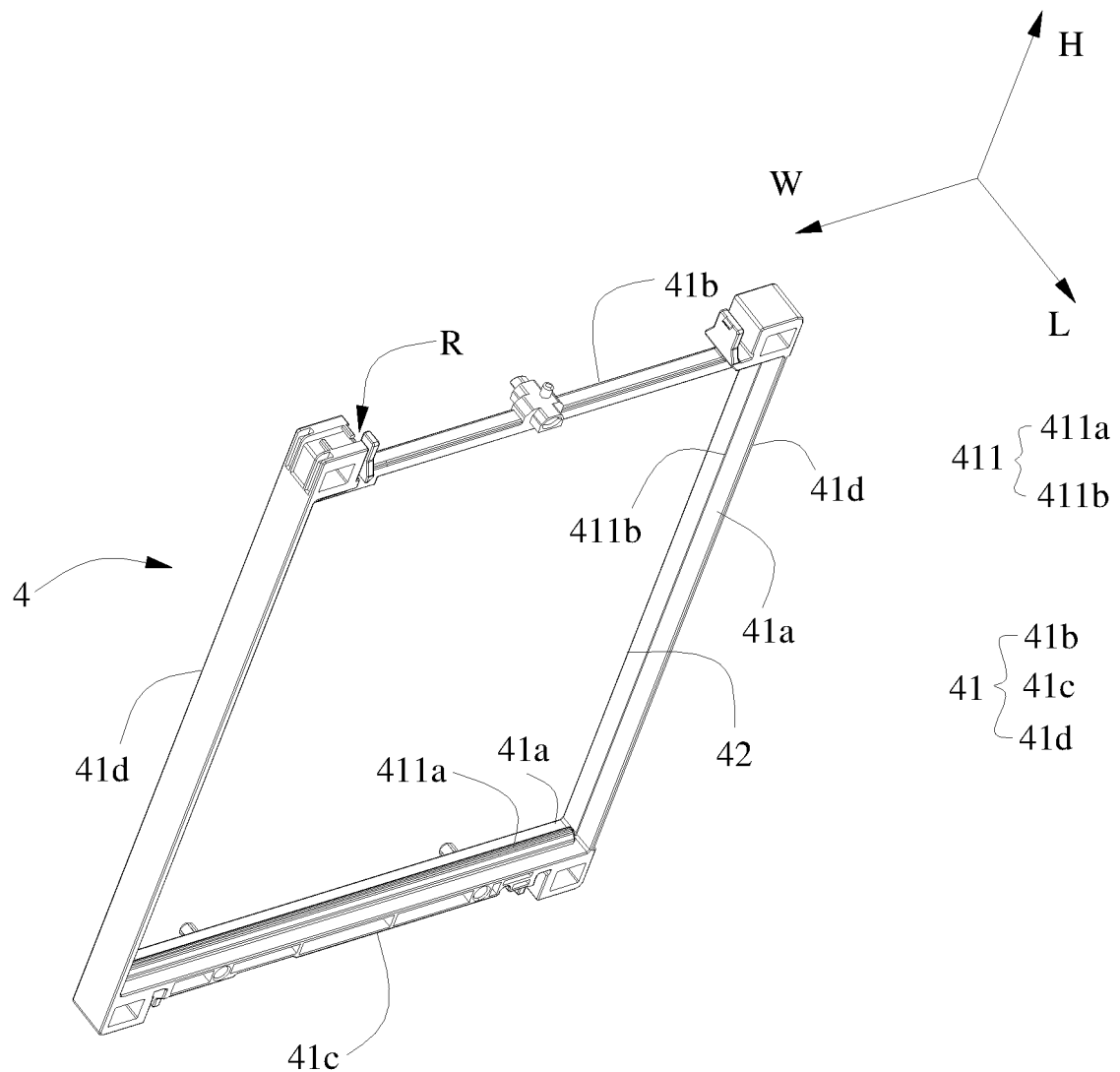
FIG. 11 is a stereoscopic view of a fastening holder of a battery module from another angle of view provided by an embodiment of the present application.
Figure 12:
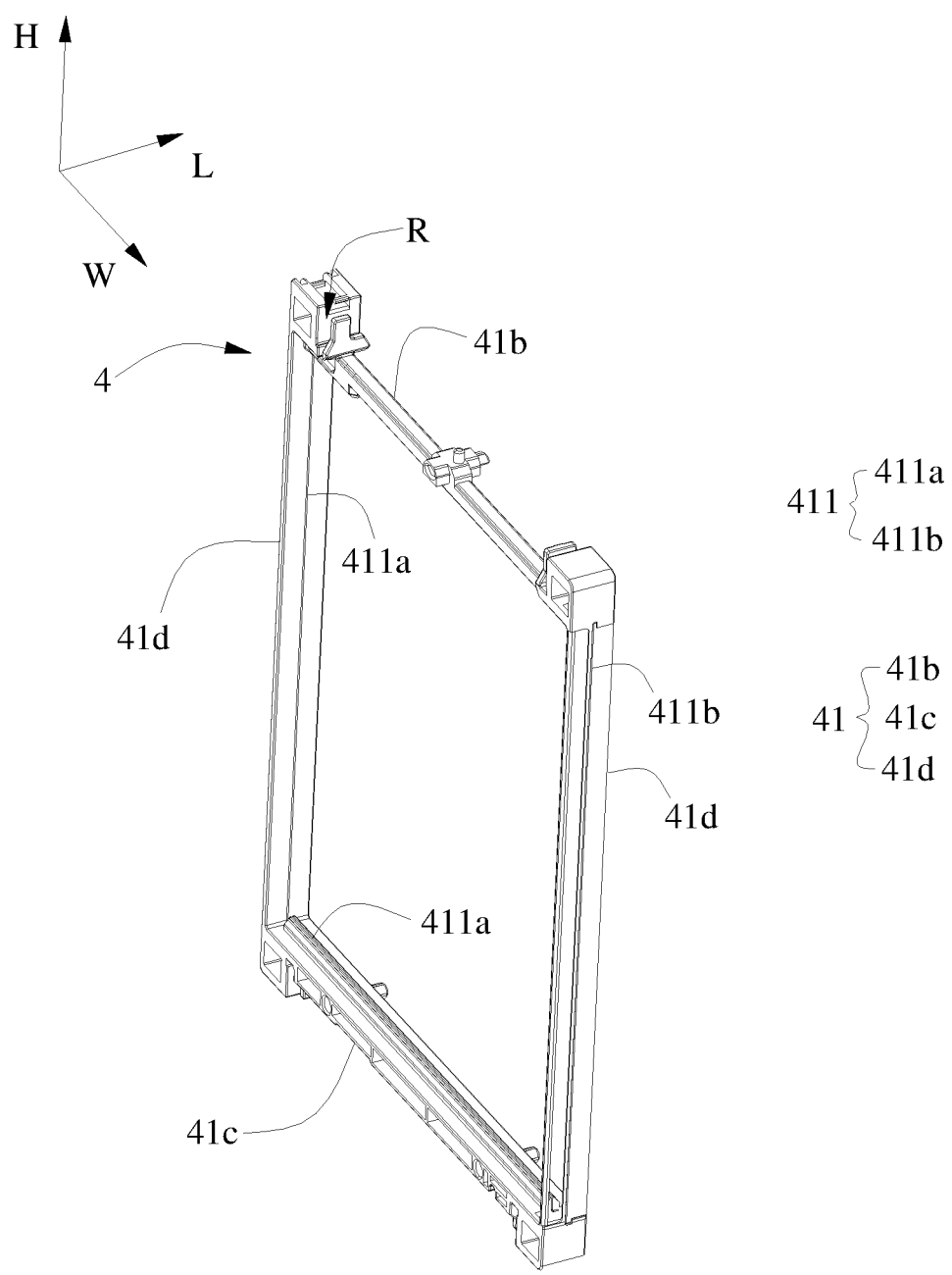
FIG. 12 is a stereoscopic view of a fastening holder of a battery module from still another angle of view provided by an embodiment of the present application.

Referring to FIG. 9 and FIG. 10, specifically, the accommodation groove 413 includes a first portion 413a and a second portion 413b. The first portion 413a extends in the width direction W, and the aperture 412 is located inside the first portion 413a. The second portion 413b is connected to the first portion 413a and extends from the first portion 413a in a height direction H. The structure of the accommodation groove 413 is not limited thereto. In addition, a thermally conductive adhesive may be used to fasten the temperature sensing element 3 to the first portion 413a of the accommodation groove 413.

Referring back to FIG. 1 to FIG. 4, the isolation board 5 is disposed above a corresponding battery 1. The isolation board 5 includes a through groove 52 in the height direction H. The tab 11 passes through the through groove 52.

As shown in FIG. 4, one end of the acquisition line 6 is connected to the temperature sensing element 3. The other end of the acquisition line 6 is connected to the plug connector 7. The plug connector 7 is connected to a circuit board (not shown). This implements an entire temperature sampling circuit of the battery module. A portion of the acquisition line 6 being connected to the temperature sensing element 3 is accommodated in the accommodation groove 413 to facilitate cabling. Specifically, the portion of the acquisition line 6 being connected to the temperature sensing element 3 may be accommodated in the second portion 413b of the accommodation groove 413.

To ensure that the temperature sensing element 3 is in contact with the thermal conduction plate 2, the acquisition line 6 needs to be reliably fastened. Specifically, the isolation board 5 is provided with a buckle 51. The acquisition line 6 is fastened on the isolation board 5 through the buckle 51. The acquisition line 6 is fastened through the buckle 51 to reduce the pulling of the acquisition line 6 on the temperature sensing element 3 during vibration and impact. This can improve the reliability of the contact between the temperature sensing element 3 and the thermal conduction plate 2. The top wall 41b of the fastening holder 4 is provided with a cabling groove R with an upward opening. The cabling groove R communicates with the second portion 413b of the accommodation groove 413. The acquisition line 6 passes through the cabling groove R. In addition, the acquisition line 6 can be fastened in a direction of the cabling groove R and the second portion 413b by using the thermally conductive adhesive.

An embodiment of the present application further provides a device, including the battery module described in the foregoing embodiments. The battery module is configured to provide electric energy. The device may be a vehicle or an energy storage device.

The foregoing detailed description describes several example embodiments. However, this specification is not intended to be limited to the explicitly disclosed combinations. Therefore, unless otherwise stated, the various features disclosed herein can be combined to form multiple additional combinations that are not shown for the purpose of brevity.

The foregoing is merely illustrative of the embodiments of the present application and is not intended to limit the present application, and various changes and modifications may be made to the present application by those skilled in the art. Any modifications, equivalent replacements, improvements, or the like within the spirit and principle of the present application shall fall within the protection scope of the present application.

What is claimed is:

1. A battery module, comprising a plurality of batteries, a thermal conduction plate, and a temperature sensing element; wherein
   the plurality of batteries are arranged in a length direction;
   the thermal conduction plate is located between the adjacent batteries and fits the batteries; and
   the temperature sensing element is in contact with the thermal conduction plate;
   wherein the battery module further comprises a fastening holder, the fastening holder comprises a surrounding wall and a hollow cavity encircled by the surrounding wall,
   the surrounding wall is provided with an accommodation groove and an aperture, the aperture is located inside the accommodation groove, and the temperature sensing element is fastened to the accommodation groove and in contact with the exposed part of the thermal conduction plate;
   the surrounding wall comprises a top wall, a bottom wall, and two side walls, the accommodation groove is recessed inward relative to a surface of the top wall in the length direction, and the accommodation groove is located at one end of the top wall in a width direction.

2. The battery module according to claim 1, wherein an inner side surface of the surrounding wall is provided with a limiting groove connecting with the hollow cavity, and the thermal conduction plate is inserted into the limiting groove and seals the hollow cavity.

3. The battery module according to claim 2, wherein the battery module further comprises an isolation board, an acquisition line, and a plug connector;
   the isolation board is disposed above a corresponding battery;
   one end of the acquisition line is connected to the temperature sensing element, the other end of the acquisition line is connected to the plug connector, and the plug connector is connected to a circuit board; and
   a portion of the acquisition line being connected to the temperature sensing element is accommodated in an accommodation groove, the accommodation groove is provided on the surrounding wall.

4. The battery module according to claim 2, wherein the surrounding wall is provided with an aperture, the thermal conduction plate has an exposed part exposed from the aperture, and the temperature sensing element is in contact with the exposed part of the thermal conduction plate.

5. The battery module according to claim 4, wherein the surrounding wall is provided with an accommodation groove, the aperture is located inside the accommodation groove, and the temperature sensing element is fastened to the accommodation groove and in contact with the exposed part of the thermal conduction plate.

6. The battery module according to claim 4, wherein the battery module further comprises an isolation board, an acquisition line, and a plug connector;
   the isolation board is disposed above a corresponding battery;
   one end of the acquisition line is connected to the temperature sensing element, the other end of the acquisition line is connected to the plug connector, and the plug connector is connected to a circuit board; and
   a portion of the acquisition line being connected to the temperature sensing element is accommodated in an accommodation groove, the accommodation groove is provided on the surrounding wall.

7. The battery module according to claim 4, wherein the surrounding wall comprises a top wall, a bottom wall, and two side walls; the limiting groove comprises a first limiting groove formed in the top wall, the bottom wall, and one of the side walls, and a second limiting groove formed in the other side wall, and the second limiting groove extends through the other side wall in the width direction.

8. The battery module according to claim 2, wherein the surrounding wall comprises a top wall, a bottom wall, and two side walls; the limiting groove comprises a first limiting groove formed in the top wall, the bottom wall, and one of the side walls, and a second limiting groove formed in the other side wall, and the second limiting groove extends through the other side wall in the width direction.

9. The battery module according to claim 8, wherein the thermal conduction plate comprises a body portion and a bent portion, and the bent portion is connected to the body portion and bent from the body portion in the length direction.

10. The battery module according to claim 9, wherein the second limiting groove extends through the side wall of the fastening holder being away from an accommodation groove in the width direction, the accommodation groove is provided on the surrounding wall.

11. The battery module according to claim 10, wherein the body portion is inserted into the fastening holder via the second limiting groove, and the bent portion is located on an outer side of the fastening holder in the length direction.

12. The battery module according to claim 1, wherein the accommodation groove comprises a first portion and a second portion;
   the first portion extends in the width direction, and the aperture is located inside the first portion; and
   the second portion is connected to the first portion and extends from the first portion in a height direction.

13. The battery module according to claim 1, wherein the battery module further comprises an isolation board, an acquisition line, and a plug connector;
   the isolation board is disposed above a corresponding battery;
   one end of the acquisition line is connected to the temperature sensing element, the other end of the acquisition line is connected to the plug connector, and the plug connector is connected to a circuit board; and
   a portion of the acquisition line being connected to the temperature sensing element is accommodated in an accommodation groove, the accommodation groove is provided on the surrounding wall.

14. The battery module according to claim 13, wherein the isolation board comprises a through groove in the height direction, a tab passes through the through groove.

15. The battery module according to claim 13, wherein the accommodation groove comprises a first portion and a second portion;
   the first portion extends in the width direction, and the aperture is located inside the first portion; and
   the second portion is connected to the first portion and extends from the first portion in a height direction;

the portion of the acquisition line being connected to the temperature sensing element is accommodated in the second portion of the accommodation groove.

16. The battery module according to claim 13, wherein the isolation board is provided with a buckle, and the acquisition line is fastened on the isolation board through the buckle;

the accommodation groove comprises a first portion and a second portion;

the first portion extends in the width direction, and the aperture is located inside the first portion; and the second portion is connected to the first portion and extends from the first portion in a height direction; and a top wall of the fastening holder is provided with a cabling groove with an upward opening, the cabling groove is connected with the second portion of the accommodation groove, and the acquisition line passes through the cabling groove.

17. A device, comprising: the battery module according to claim 1, wherein the battery module is configured to provide electric energy.

* * * * *